(12) United States Patent
Colby et al.

(10) Patent No.: US 12,098,309 B2
(45) Date of Patent: *Sep. 24, 2024

(54) SYSTEMS FOR SECURING PROTECTIVE FILMS TO SURFACES OF SUBSTRATES

(71) Applicant: ZAGG Inc, Midvale, UT (US)

(72) Inventors: Jim A Colby, Highland, UT (US); Gregory E. Booth, Hilliard, OH (US)

(73) Assignee: ZAGG Inc, Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,598

(22) Filed: Sep. 7, 2021

(65) Prior Publication Data

US 2021/0403764 A1 Dec. 30, 2021

Related U.S. Application Data

(63) Continuation of application No. 15/431,756, filed on Feb. 13, 2017, now Pat. No. 11,111,418, which is a
(Continued)

(51) Int. Cl.
*C09J 7/29* (2018.01)
*B29C 63/00* (2006.01)
(Continued)

(52) U.S. Cl.
CPC ............. *C09J 7/29* (2018.01); *B29C 63/0004* (2013.01); *B29C 63/0047* (2013.01);
(Continued)

(58) Field of Classification Search
CPC . C09J 7/29; C09J 7/40; C09J 2301/122; C09J 2301/162; C09J 2475/006;
(Continued)

(56) References Cited

U.S. PATENT DOCUMENTS 3,971,691 A 7/1976 Cairns
3,987,569 A 10/1976 Chase
(Continued)

FOREIGN PATENT DOCUMENTS

GB 2328071 A 2/1999
JP 2002-297041 A 10/2002
(Continued)

OTHER PUBLICATIONS

Petite, Edward M., "Selecting an Adhesive—Like Selecting a Marriage Partner, Special Chem," http://www.specialchem4adhesives.com/home/editorial./aspx?id353, May 28, 2003.
(Continued)

*Primary Examiner* — Patricia L. Nordmeyer
(74) *Attorney, Agent, or Firm* — DENTONS Durham Jones Pinegar

(57) ABSTRACT

Systems and films for protecting surfaces of various substrates, including electronic devices, such as portable electronic devices, include a liner with a strip liner and a main liner. The strip liner, which covers a small strip of adhesive on the back side of a protective film, is configured to be removed before the main liner. With the small strip of adhesive exposed, the protective film may be aligned with a substrate and, if necessary, removed from the substrates and repositioned thereon. Thereafter, the main liner may be removed to enable complete application of the protective film to the substrate. Methods for securing protective films to substrates are also disclosed.

20 Claims, 6 Drawing Sheets

Related U.S. Application Data continuation of application No. 14/750,370, filed on Jun. 25, 2015, now Pat. No. 9,580,626, which is a continuation-in-part of application No. 13/865,175, filed on Apr. 17, 2013, now Pat. No. 9,777,195, which is a continuation-in-part of application No. 13/166,745, filed on Jun. 22, 2011, now Pat. No. 11,472,098.

(60) Provisional application No. 61/625,550, filed on Apr. 17, 2012, provisional application No. 61/357,972, filed on Jun. 23, 2010, provisional application No. 61/357,427, filed on Jun. 22, 2010.

(51) Int. Cl.

| | | |
|---|---|---|
| *B29C 63/02* | (2006.01) | |
| *B32B 3/02* | (2006.01) | |
| *B32B 7/06* | (2019.01) | |
| *B32B 7/12* | (2006.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *C09J 7/40* | (2018.01) | |
| *G06F 1/16* | (2006.01) | |
| *H04M 1/02* | (2006.01) | |
| *B29L 31/34* | (2006.01) | |
| *H04M 1/18* | (2006.01) | |

(52) U.S. Cl.
CPC .............. *B29C 63/02* (2013.01); *B32B 3/02* (2013.01); *B32B 7/06* (2013.01); *B32B 7/12* (2013.01); *B32B 27/08* (2013.01); *B32B 27/283* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *C09J 7/40* (2018.01); *G06F 1/1656* (2013.01); *H04M 1/0202* (2013.01); *B29C 2063/0008* (2013.01); *B29C 2063/027* (2013.01); *B29L 2031/3437* (2013.01); *B29L 2031/3475* (2013.01); *B32B 2307/41* (2013.01); *B32B 2307/412* (2013.01); *B32B 2307/414* (2013.01); *B32B 2307/518* (2013.01); *B32B 2457/00* (2013.01); *C09J 2301/122* (2020.08); *C09J 2301/162* (2020.08); *C09J 2475/006* (2013.01); *G06F 1/1626* (2013.01); *G06F 2200/1634* (2013.01); *H04M 1/0266* (2013.01); *H04M 1/18* (2013.01); *H04M 1/185* (2013.01); *Y10T 428/1471* (2015.01)

(58) Field of Classification Search
CPC . B29C 63/0004; B29C 63/0047; B29C 63/02; B29C 2063/0008; B29C 2063/027; B32B 3/02; B32B 7/06; B32B 7/12; B32B 27/08; B32B 27/283; B32B 27/304; B32B 27/306; B32B 27/308; B32B 27/32; B32B 27/36; B32B 27/40; B32B 2307/41; B32B 2307/412; B32B 2307/414; B32B 2307/518; B32B 2457/00; G06F 1/1656; G06F 1/1626; G06F 2200/1634; H04M 1/0202; H04M 1/0266; H04M 1/18; H04M 1/185; B29L 2031/3437; B29L 2031/3475; Y10T 428/1471
See application file for complete search history.

(56) References Cited

U.S. PATENT DOCUMENTS

| | | |
|---|---|---|
| 4,026,485 A | 5/1977 | Ambrose |
| 4,119,332 A | 10/1978 | Merrill |
| 4,709,695 A | 12/1987 | Kohn et al. |
| 4,728,380 A | 3/1988 | Jones et al. |
| RE33,353 E | 9/1990 | Heinecke |
| 5,147,489 A | 9/1992 | Scrutton et al. |
| 5,419,666 A | 5/1995 | Best |
| 5,498,455 A | 3/1996 | Roberts |
| 5,520,629 A | 5/1996 | Heinecke et al. |
| 5,888,335 A | 3/1999 | Kobe et al. |
| 5,951,054 A | 9/1999 | Hagen et al. |
| 6,008,429 A | 12/1999 | Ritger |
| 6,054,009 A | 4/2000 | Cote et al. |
| 6,129,929 A | 10/2000 | Wick |
| 6,159,497 A | 12/2000 | LaPrade et al. |
| 6,297,422 B1 | 10/2001 | Hansen et al. |
| 6,613,411 B2 | 9/2003 | Kollaja et al. |
| 6,700,033 B1 | 3/2004 | Marcussen et al. |
| 6,733,863 B1 | 5/2004 | Mizuno et al. |
| 6,758,000 B2 | 7/2004 | Sandt et al. |
| 6,821,593 B2 | 11/2004 | Maggio et al. |
| D578,164 S | 10/2008 | Ingle |
| 8,044,942 B1 | 10/2011 | Leonhard et al. |
| D658,164 S | 4/2012 | Chan |
| 8,236,400 B2 | 8/2012 | Trigg et al. |
| 8,333,408 B2* | 12/2012 | Flynn .................. G06F 1/1656 |
| | | 283/105 |
| 8,393,377 B2 | 3/2013 | Patel et al. |
| 8,517,367 B1 | 8/2013 | Napier |
| 8,594,755 B1 | 11/2013 | Tages et al. |
| 8,640,759 B2 | 2/2014 | Chen |
| 8,642,173 B2 | 2/2014 | O'Donnell |
| 8,655,481 B2 | 2/2014 | Sheu |
| D708,804 S | 7/2014 | Piro |
| 8,923,937 B2 | 12/2014 | Tages et al. |
| 8,940,122 B2 | 1/2015 | Cohen et al. |
| 8,944,425 B2 | 2/2015 | Napier |
| D727,330 S | 4/2015 | Reaux |
| 9,033,019 B2 | 5/2015 | Patel et al. |
| D734,311 S | 7/2015 | Takamoto et al. |
| 9,079,383 B2 | 7/2015 | Tapio et al. |
| 9,089,085 B2 | 7/2015 | Patel et al. |
| 9,120,954 B2 | 9/2015 | Feller |
| 9,192,086 B2 | 11/2015 | Hsu et al. |
| D746,265 S | 12/2015 | Colby et al. |
| 9,228,117 B2 | 1/2016 | Sherman et al. |
| 9,248,634 B2 | 2/2016 | Cohen et al. |
| 9,580,626 B2 | 2/2017 | Colby et al. |
| 9,688,016 B2 | 6/2017 | Rostami |
| 9,777,195 B2 | 10/2017 | Colby et al. |
| 9,918,418 B2 | 3/2018 | Chou |
| 10,009,057 B2 | 6/2018 | Chaves et al. |
| 10,364,374 B2 | 7/2019 | Colby et al. |
| 10,421,885 B2 | 9/2019 | Colby et al. |
| 10,608,689 B2 | 3/2020 | Chaves et al. |
| 11,111,418 B2* | 9/2021 | Colby .................. B32B 27/283 |
| 2001/0053648 A1 | 12/2001 | Furukawa et al. |
| 2003/0082327 A1 | 5/2003 | Pearson et al. |
| 2004/0131815 A1 | 7/2004 | Maggio et al. |
| 2004/0137249 A1 | 7/2004 | Kamiyama |
| 2004/0170817 A1 | 9/2004 | Fox et al. |
| 2004/0246386 A1 | 12/2004 | Thomas et al. |
| 2005/0087977 A1 | 4/2005 | Crum |
| 2005/0116334 A1 | 6/2005 | Buehler |
| 2005/0168697 A1 | 8/2005 | Bruzzone et al. |
| 2006/0062953 A1 | 3/2006 | Trigg et al. |
| 2006/0186001 A1 | 8/2006 | Anderson et al. |
| 2006/0262405 A1 | 11/2006 | Brumwell |
| 2008/0099152 A1 | 5/2008 | Nakamura |
| 2009/0075006 A1 | 3/2009 | Lynam et al. |
| 2009/0186181 A1* | 7/2009 | Mase .................. B29C 63/02 |
| | | 156/60 |
| 2009/0186198 A1 | 7/2009 | McGuire, Jr. |
| 2009/0286073 A1 | 11/2009 | Hamano |
| 2009/0301907 A1 | 12/2009 | Mason |

(56) References Cited

U.S. PATENT DOCUMENTS

| | | |
|---|---|---|
| 2009/0313902 A1 | 12/2009 | Brisbois et al. |
| 2010/0092713 A1 | 4/2010 | Bullard et al. |
| 2010/0098942 A1 | 4/2010 | Stachnik et al. |
| 2010/0264566 A1 | 10/2010 | Moore et al. |
| 2011/0020640 A1 | 1/2011 | Sherman et al. |
| 2011/0250375 A1 | 10/2011 | Bries et al. |
| 2011/0267793 A1 | 11/2011 | Cohen et al. |
| 2011/0293870 A1* | 12/2011 | Lin .................. B32B 25/20 428/42.1 |
| 2011/0309608 A1 | 12/2011 | Flynn et al. |
| 2012/0008269 A1 | 1/2012 | Gengler |
| 2012/0057287 A1* | 3/2012 | Chaves ................ C09J 7/22 361/679.3 |
| 2012/0064318 A1 | 3/2012 | Keite-Telgenbüscher et al. |
| 2012/0087072 A1* | 4/2012 | McGuire ............ B29C 63/02 361/679.01 |
| 2012/0183712 A1 | 7/2012 | Leonhard et al. |
| 2012/0183713 A1 | 7/2012 | Leonhard et al. |
| 2012/0211168 A1 | 8/2012 | Patel et al. |
| 2013/0045371 A1 | 2/2013 | O'Donnell |
| 2013/0045372 A1 | 2/2013 | O'Donnell |
| 2013/0048203 A1 | 2/2013 | Yau et al. |
| 2013/0156999 A1 | 6/2013 | Braesch et al. |
| 2013/0171400 A1 | 7/2013 | Lin |
| 2013/0199714 A1 | 8/2013 | Patel et al. |
| 2013/0295310 A1 | 11/2013 | Tages et al. |
| 2013/0296004 A1 | 11/2013 | Tages et al. |
| 2013/0299075 A1 | 11/2013 | Colby et al. |
| 2013/0316112 A1 | 11/2013 | Leonhard et al. |
| 2014/0072749 A1 | 3/2014 | Leonhard et al. |
| 2014/0109284 A1 | 4/2014 | Lefrancois, Jr. |
| 2014/0124146 A1 | 5/2014 | Patel et al. |
| 2014/0130971 A1 | 5/2014 | Wu et al. |
| 2014/0134412 A1 | 5/2014 | O'Donnell |
| 2014/0139991 A1 | 5/2014 | Gengler |
| 2014/0230988 A1 | 8/2014 | Chou |
| 2015/0041069 A1 | 2/2015 | Wadsworth et al. |
| 2015/0047773 A1 | 2/2015 | Wadsworth et al. |
| 2015/0107767 A1 | 4/2015 | Wadsworth et al. |
| 2015/0169089 A1 | 6/2015 | Dixon et al. |
| 2015/0246514 A1 | 9/2015 | LaColla et al. |
| 2015/0246515 A1 | 9/2015 | Patel et al. |
| 2015/0273786 A1 | 10/2015 | Ozeki |
| 2015/0291854 A1 | 10/2015 | Colby et al. |
| 2015/0314523 A1 | 11/2015 | Mason et al. |
| 2015/0321416 A1 | 11/2015 | Patel et al. |
| 2015/0323961 A1 | 11/2015 | Leonhard et al. |
| 2015/0370288 A1 | 12/2015 | Dinesh |
| 2016/0009024 A1 | 1/2016 | Mason |
| 2018/0117874 A1 | 5/2018 | Rothbauer et al. |
| 2018/0350641 A1 | 12/2018 | Nakamura et al. |
| 2019/0072692 A1 | 3/2019 | Baek et al. |

FOREIGN PATENT DOCUMENTS

| | | |
|---|---|---|
| JP | 2006168344 A | 6/2006 |
| JP | 2008030174 A | 2/2008 |
| KR | 1020050093046 U | 9/2005 |
| KR | 1020060022825 A | 3/2006 |
| KR | 1020060022952 A | 3/2006 |
| KR | 1020060094268 A | 8/2006 |
| WO | 2001052223 A2 | 7/2001 |

OTHER PUBLICATIONS

Eclometer Instruments, 2006.

USPTO as International Searching Authority, "International Search Report and Written Opinion," International Application No. PCT/US2011/041525, Jan. 11, 2012.

Korean Intellectual Property Office as International Searching Authority, "International Search Report and Written Opinion," International Application No. PCT/US2011/050216, Apr. 12, 2012.

* cited by examiner

SYSTEMS FOR SECURING PROTECTIVE FILMS TO SURFACES OF SUBSTRATES

CROSS-REFERENCE TO RELATED APPLICATIONS

This application is a continuation of U.S. patent application Ser. No. 15/431,756, filed on Feb. 13, 2017 and titled SYSTEMS FOR SECURING PROTECTIVE FILMS TO SURFACES OF SUBSTRATES ("the '756 Application"), now U.S. Pat. No. 11,111,418, issued Sep. 7, 2021, which is a continuation of U.S. patent application Ser. No. 14/750,370, filed on Jun. 25, 2015 and titled SYSTEMS FOR SECURING PROTECTIVE FILMS TO SURFACES OF SUBSTRATES ("the '370 Application"), now U.S. Pat. No. 9,580,626, issued Feb. 28, 2017. The '370 Application is a continuation-in-part of U.S. patent application Ser. No. 13/865,175, filed on Apr. 17, 2013 and titled DRY APPLY PROTECTIVE SYSTEMS AND METHODS ("the '175 Application"). In the '175 Application, a claim for the benefit of priority to the Apr. 17, 2012 filing date of U.S. Provisional Patent Application No. 61/625,550, titled DRY APPLY PROTECTIVE SYSTEMS AND METHODS ("the '550 Provisional Application") as made pursuant to 35 U.S.C. § 119(e). The '175 Application is also a continuation-in-part of U.S. patent application Ser. No. 13/166,745, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS, filed on Jun. 22, 2011 ("the '745 Application"), in which claims were made for the benefit of priority to U.S. Provisional Patent Application 61/357,972, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS and filed on Jun. 23, 2010 ("the '972 Provisional Application") pursuant to 35 U.S.C. § 119(e) and to U.S. Provisional Patent Application 61/357,427, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS and filed on Jun. 22, 2010 ("the '427 Provisional Application") pursuant to 35 U.S.C. § 119(e). The entire disclosure of each of the '756 Application, the '370 Application, the '175 Application, the '427 Provisional Application, the '972 Provisional Application, the '745 Application, and the '550 Provisional Application is hereby incorporated herein.

TECHNICAL FIELD

This disclosure relates generally to systems and films for protecting surfaces of various substrates, including electronic devices, such as portable electronic devices. More specifically, this disclosure relates to systems and protective films that may be applied to a surface to be protected without the presence of contaminants or visible air bubbles between the film and the surface and without the use of a solution to eliminate the presence of visible air bubbles. This disclosure also relates to systems for ensuring that protective films are precisely aligned with the surfaces to which they are to be secured. In addition, this disclosure relates to methods for protecting the surfaces of substrates, such as portable electronic devices.

SUMMARY

In various aspects and embodiments, this disclosure relates to systems for protecting surfaces of electronic devices (e.g., portable electronic devices, etc.) and other substrates. Such a system enables the application of a protective film to a surface of an electronic device or another substrate.

In one aspect, such a system includes a protective film with upper and lower surfaces, and a liner adhesively secured to the lower surface of the protective film. The liner, which may also be referred to as a "backing" (see, e.g., the '175 Application), may include two separate or separable elements—a strip liner and a main liner. The strip liner of such a liner may be located over an end of lower surface of the protective film, while the main liner may cover a remainder of the lower surface of the protective film. In addition, such an embodiment of a system for protecting a surface of an electronic device or another substrate may include a cap shield, which is also referred to as an "application tape" (see, e.g., the '175 Application) over the protective film. Optionally, a release layer may be located between the protective film and the cap shield.

In embodiments where a system according to this disclosure includes a cap shield, tabs may be located at opposite ends of the cap shield. The tabs, which may protrude beyond opposite ends of a protective film of the system, may enable alignment of the protective film over the surface.

Such a system may be used by removing the strip liner from the adhesive material-coated lower surface of a protective film to expose a strip of adhesive material, aligning the protective film with the surface to which it is to be secured and, with the protective film and the surface in alignment, securing the strip of adhesive material to the surface. Thereafter, an opposite end of the protective film may be lifted away from the surface. While the protective element is in such an orientation (i.e., an at least partially upright orientation), a linear force may be applied across a width of the portion of the protective film that has been secured to the surface, and then moved toward the end of the protective film that has been lifted. Once the protective film has been secured to the surface in a desired manner (e.g., when there are no or substantially no air bubbles between the protective film and the surface, etc.), a cap shield and a release layer, if any, may be removed from the upper surface of the protective film.

In another aspect, a system may include a protective film and a release layer or another element over the upper surface of protective film, which release layer or other element may be configured to enable precise alignment of the protective film with the surface on which it is to be adhesively secured. Thus, the release layer or other element may also be referred to as an "alignment element." In such a system, the liner and the cap shield, if any, may be transparent and colorless. As a result, the boundaries of a transparent, colorless protective film between the liner and the cap shield may be invisible, or they may be very difficult for an individual to see. By providing an alignment element, such as a release layer, that has the same configuration (e.g., shape, dimensions, etc.) as the protective film, over the protective film in complete superimposition therewith, and that contrasts with (e.g., is transparent and colored, translucent, etc.) and is visible through the liner and the cap shield, the alignment element may enable precise alignment between the protective film and the surface to which the protective film is to be adhesively secured.

In use, at least a portion of a liner of such a system may be removed from an adhesive material-coated lower surface of the protective film and the surface to which the protective film is to be applied may be visualized through the alignment element, which may enable precise alignment of the alignment element and, thus, the protective film with the surface. With the alignment element and the protective film properly aligned, the protective film may be secured to the surface. The alignment element may then be removed from the upper surface of the protective film.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
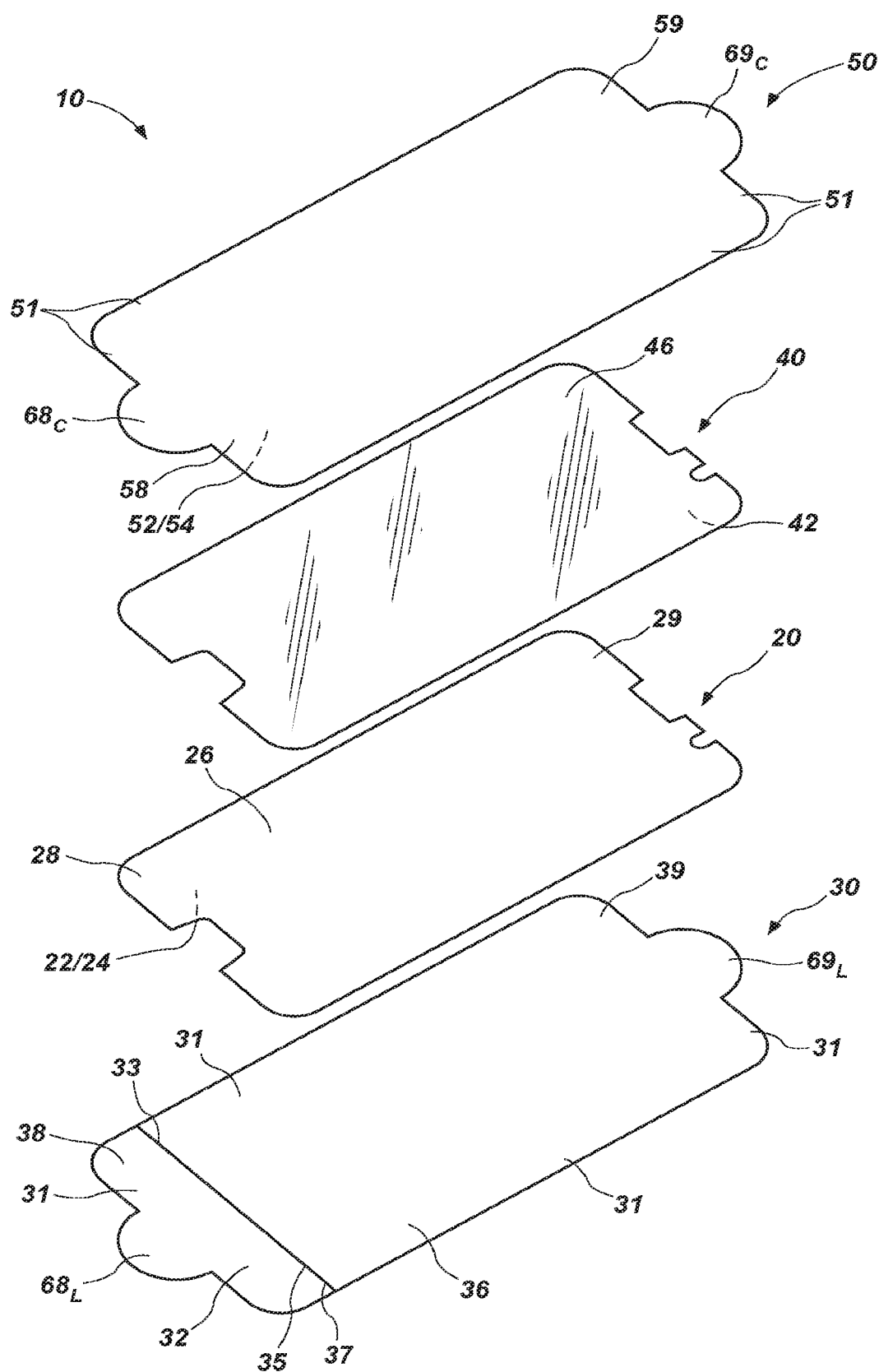
FIG. 1 is an assembly view of an embodiment of a system according to this disclosure.
Figure 2:
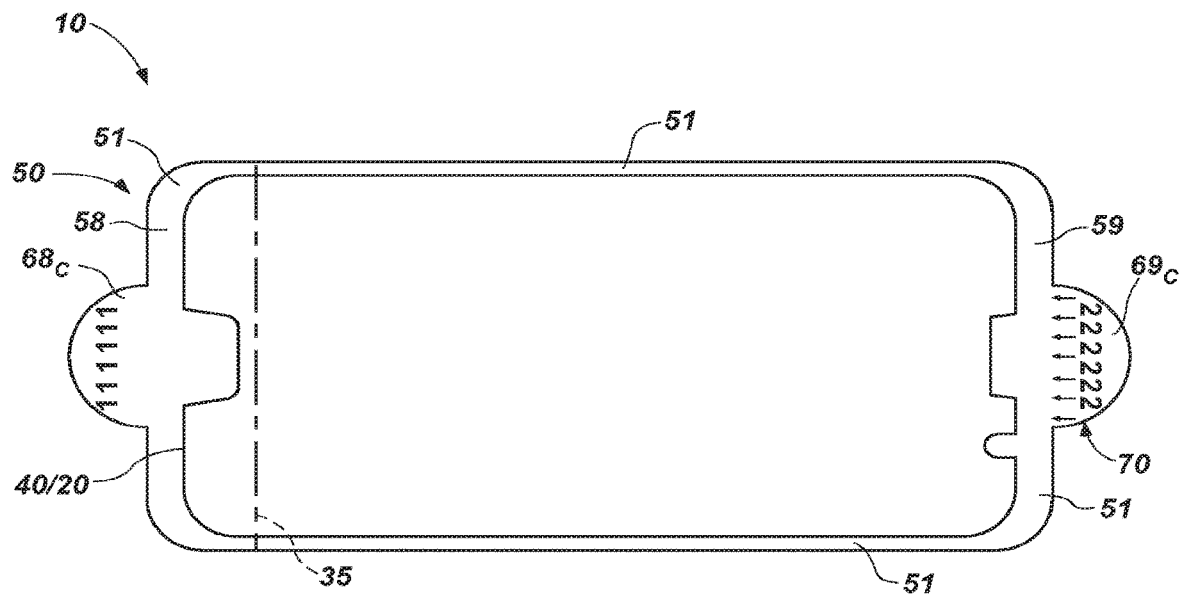
FIG. 2 is a top view of the embodiment of system shown in FIG. 1.
Figure 3:
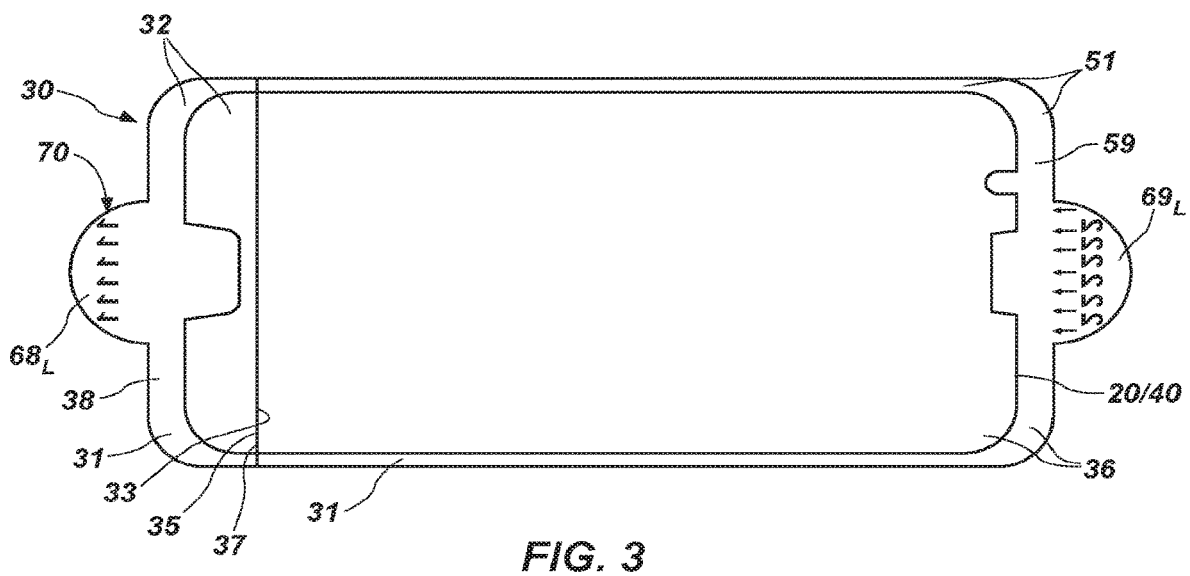
FIG. 3 is a bottom view of the embodiment of system shown in FIG. 1.

With reference to FIGS. 1, 2, and 3, an embodiment of a system 10 for protecting a surface of a substrate, such as an electronic device (e.g., a consumer electronic device, such as a smart phone, a portable media player, a tablet computing device, a wearable electronic device, a laptop computer, etc.) is illustrated. The system 10 includes a protective film 20 and a liner 30. Additionally, the system 10 may include a release layer 40, which may also function as an alignment element, and a cap shield 50.

The protective film 20 of the system 10 is configured to be secured to the surface of a substrate (not shown in FIG. 1, 2, or 3) and to remain in place on the surface. A lower surface 22 of the protective film 20 may be coated with a suitable adhesive material 24, which may adhesively secure the lower surface 22 of the protective film 20 to the surface of the substrate. When the protective film 20 has been installed on a surface of a substrate, an upper surface 26, or an outer surface, of the protective film 20 will be exposed, and may comprise the surface with which a user interacts (e.g., by touching, with a stylus, etc.) when using the substrate or a feature thereof (e.g., a touch screen of a smart phone, tablet computing device, laptop computer, etc.).

In some embodiments, the protective film 20 may be formed from a plastic material, such as a polyurethane. A number of polyurethanes may provide desirable protective properties. In embodiments where the protective film 20 is transparent, a polyurethane may impart the protective film 20 with desirable optical properties (e.g., a clarity through which information or images may be viewed with little or no visible (to the naked eye, without image enhancement, etc.) distortion, etc.). For the sake of simplicity, the term "polyurethane," as used herein, includes polymers that include urethane, or "carbamate," linkages. A polyurethane may also include urea linkages, as well as combinations of urethane and urea linkages (e.g., poly(urethane-urea)s, etc.).

Other materials that may be suitable for use in forming the protective film 20 include polyvinyl chloride, polyvinyl acetate, polypropylene, polyester, poly(meth)acrylate, polyethylene, and rubbery resins (e.g., silicone elastomers, etc.). In other embodiments, the protective film 20 of a system 10 according to this disclosure may comprise glass.

The adhesive material 24 may comprise a pressure-sensitive adhesive material that will semi-permanently secure the protective film 20 to the surface of a substrate. In addition, the adhesive material 24 may be optically transparent. Example of adhesive materials with these properties include, but are not limited to, (meth)acrylates (e.g., acrylates, methacrylate, etc.), as well as adhesive materials that include chemistries based on natural and synthetic rubbers, polybutadiene and copolymers thereof, polyisoprene and copolymers thereof, and silicones (e.g., polydimethylsiloxane, polymethylphenylsiloxane, etc.). In a particular embodiment, the adhesive material 24 may include 2-ethyl hexyl acrylate, vinyl acetate, and polymerized acrylic acid monomers. Such an adhesive material is available from entrochem, inc., of Columbus, Ohio, under trade name ENTROCHEM™-ECA 340.

The embodiment of liner 30 depicted by FIGS. 1-3 may also be transparent. Such a liner 30 is secured to the adhesive material 24 on the lower surface of the protective film 20. A surface of the liner 30 that is positioned against the adhesive material 24 may have a smoothness that enables the liner 30 to be readily removed from the adhesive material 24 without pulling the adhesive material 24 from the lower surface 22 of the protective film 20. In some embodiments, the liner 30 may be relatively rigid, when compared with the rigidity of the protective film 20. Of course, the liner 30 may be flexible enough to enable it bend while being peeled from the adhesive material 24 on the lower surface 22 of the protective film 20. Without limitation, the liner 30 may be formed from a biaxially-oriented polyethylene terephthalate (Bo-PET) or a stretched polyester film (e.g., that marketed by du Pont de Nemours & Co. under the MYLAR® trademark, etc.).

As shown, the liner 30 may be divided into a strip liner 32 and a main liner 36. Adjacent edges 33 and 37 of the strip liner 32 and the main liner 36, respectively, may be completely separated from one another at a boundary 35, which may comprise a cut line. The cut line may extend completely through the liner 30 without extending into the lower surface 22 of the protective film 20. Alternatively, the boundary 35 may comprise a cut line that extends partially into the liner 30, a series of perforations extending across the liner 30 or a weakened line across the liner 30, or it may have any other suitable configuration.

The strip liner 32 may cover a strip 25 of the adhesive material 24 on the lower surface 22 of the protective film 20 at a location adjacent to a first end 28 of the protective film 20. The main liner 36 may cover a remainder of the adhesive material 24, from a location adjacent to the strip 25 to a second end 29 of the protective film 20.

The system 10 may include a release layer 40 on the upper surface 26 of the protective film 20. In some embodiments, a configuration of the release layer 40 (e.g., shape(s), dimensions, etc.) may be the same as, or identical to, a configuration of the protective film 20. The release layer 40 may be completely superimposed over the protective film 20.

A lower surface 42 of the release layer 40 may be positioned against the upper surface 26 of the protective film 20 without being adhesively secured to the upper surface 26 of the protective film 20. Rather, static electricity, by way of so-called "static cling," may releasably secure the lower surface 42 of the release layer 40 to the upper surface 26 of the protective film 20. The adhesive strength of the static cling between the release layer 40 and the protective film 20 may withstand (and even exceed) the strength with which the adhesive material 24 secures the liner 30 to the lower surface 22 of the protective film 20. This difference in adhesive strengths may enable removal of the liner 30 from the lower surface 22 of the protective film 20 while the upper surface 26 of the protective film 20 remains in place against the lower surface 42 of the release layer 40. The adhesive strength of the adhesive material 24 between the lower surface 22 of the protective film 20 and a surface of a substrate on which the protective film 20 is to be secured (e.g., a display of a portable electronic device, etc.) may, however, exceed the adhesive strength of static cling between the release layer 40 and the protective film 20, which may enable the lower surface 22 of the protective film 20 to remain in place on the surface against which it has been positioned when the release layer 40 is removed from (e.g., pulled away from, etc.) the upper surface 26 of the protective film 20.

In some embodiments, including those where the protective film 20, the liner 30 and any cap shield 50 are transparent, and where the release layer 40 has the same configuration as the protective film 20, the release layer 40 may be visible through the protective film 20, the liner 30 and any cap shield 50. Such visibility may be imparted by a combination of color and transparency, translucence, a visible border or in any other manner that will enable a surface of a substrate to be visualized through the release layer 40. Visibility of the release layer 40 through the protective film 20, the liner 30 and any cap shield 50 may enable use of the release layer 40 for precise alignment of the protective film 20 with the surface to which the protective film 20 is to be applied.

As indicated previously herein, in embodiments where a system 10 according to this disclosure includes a cap shield 50, the cap shield 50 may be transparent. The cap shield 50 may be configured to receive force and/or pressure applied to an upper surface 56 thereof and to distribute the same. The distribution of such force and/or pressure may protect (e.g., prevent denting of, prevent scuffing, scratching or other blemishing of, etc.) the protective film 20 before and during application of the protective film 20 to a surface of a substrate.

The cap shield 50 includes a lower surface 52 that is coated with an adhesive material 54. The adhesive material 54 may secure an upper surface 46 of the release layer 40 to the lower surface 52 of the cap shield 50. A strength with which the adhesive material 54 on the lower surface 52 of the cap shield 50 secures the upper surface 46 of the release layer 40 to the lower surface 52 may exceed a strength with which the lower surface 42 of the release layer 40 is secured to the upper surface 26 of the protective film 20, enabling removal of the release layer 40 from the protective film 20 when the cap shield 50 is pulled away from the protective film 20.

In some embodiments, the cap shield 50 and the liner 30 may extend beyond an outer periphery 21 of the protective film 20. In a more specific embodiment, such as that depicted by FIGS. 1, 2, and 3, the cap shield 50 and the liner 30 may include peripheral portions 51 and 31, respectively, that extend beyond an entire outer periphery 21 of the protective film 20. In such embodiments, the adhesive material 54 on the peripheral portion 51 of the lower surface 52 of the cap shield 50 may secure the peripheral portion 31 of the liner 30 to the peripheral portion 51 of the cap shield 50.

Further, the adhesive material 54 may secure the peripheral portion 51 at a first end 58 of the cap shield 50 to the peripheral portion 31 at a first end 38 of the liner 30 with greater strength than the adhesive material 54 secures the peripheral portion 51 at a second end 59 of the cap shield 50 to the peripheral portion 31 at a second end 39 of the liner 30. This difference in adhesive strengths may be achieved in any of a number of different ways. Without limitation, such a differential adhesive strength may be achieved by adhering the peripheral portion 51 of the cap shield 50 to the peripheral portion 31 of the liner 30, lifting the peripheral portion 51 at the second end 59 of the cap shield 50 away from peripheral portion 31 at the second end 39 of the liner 30 while leaving the peripheral portions 31 and 51 at the first ends 38 and 58 of the liner 30 and cap shield 50 in an adhered relation and re-adhering the second end 59 of the cap shield 50 to the second end 39 of the liner 30. As another example, differential adhesive strength may be achieved by use of different adhesive materials 54 or by use of different amounts of adhesive material 54 at the first end 58 and the second end 59 of the cap shield 50. Such processes may result in a "bumped" adhesive material 54 at the second end 59 of the cap shield 50.

In addition, a system 10 according to this disclosure may include tabs $68_C$ and $69_C$ at opposite ends thereof. More specifically, the tabs $68_C$ and $69_C$ may comprise extensions from the opposite first end 58 and the second end 59, respectively, of the cap shield 50. In some embodiments, the system may also include tabs $68_L$ and $69_L$ that extend from the opposite first end 38 and second end 39, respectively, of the liner 30. Tabs $68_C$ and $68_L$ may be completely superimposed with respect to one another, and tabs $69_C$ and $69_L$ may be completely superimposed with respect to one another. The tabs $68_C$ and $69_C$ may enable a user to position the system 10 and the protective film 20 in a manner that provides an individual with more control over the application process than merely grasping the edges of the cap shield 50 and/or the protective film 20. Additionally, the tabs $68_C$ and $69_C$ may reduce the likelihood that an individual's hands will contact and contaminate the adhesive material 24 on the lower surface 22 of the protective film 20 as the protective film 20 is being applied to the surface of a substrate.

One or more of the tabs $68_C$, $68_L$, $69_C$, $69_L$ may include indicia 70. In the specific embodiment depicted by FIGS. 1-3, tab $68_L$ may include indicia 70 in the embodiment of the number "1", indicating that tab $68_L$ is the first tab to be pulled in the process of applying a protective film 20 to a surface of a substrate. When tab $68_L$ of the depicted embodiment is pulled, the strip liner 32 will be removed from the lower surface 22 of the protective film 20, which will expose the strip of 25 the adhesive material 24 on the lower surface 22 of the protective film 20.

Tab $69_C$ may include indicia 70 in the form of the number "2", which may indicate that tab $69_C$ is to be pulled at some point in time after tab $68_L$ to remove the cap shield 50 (and the release layer 40) from the upper surface 26 of the protective film 20. In some embodiments, the orientation of the indicia 70 on tab $69_C$ may be combined with bumping of the adhesive material 54 at the second end 59 of the cap shield 50 to prevent tab 68c and the first end 58 of the cap shield 50 from being pulled and the cap shield 50 (and, optionally, the release layer 40) from being removed from the protective film 20 prematurely; i.e., before the protective film 20 has been secured to a surface of a substrate.

Figure 1A:
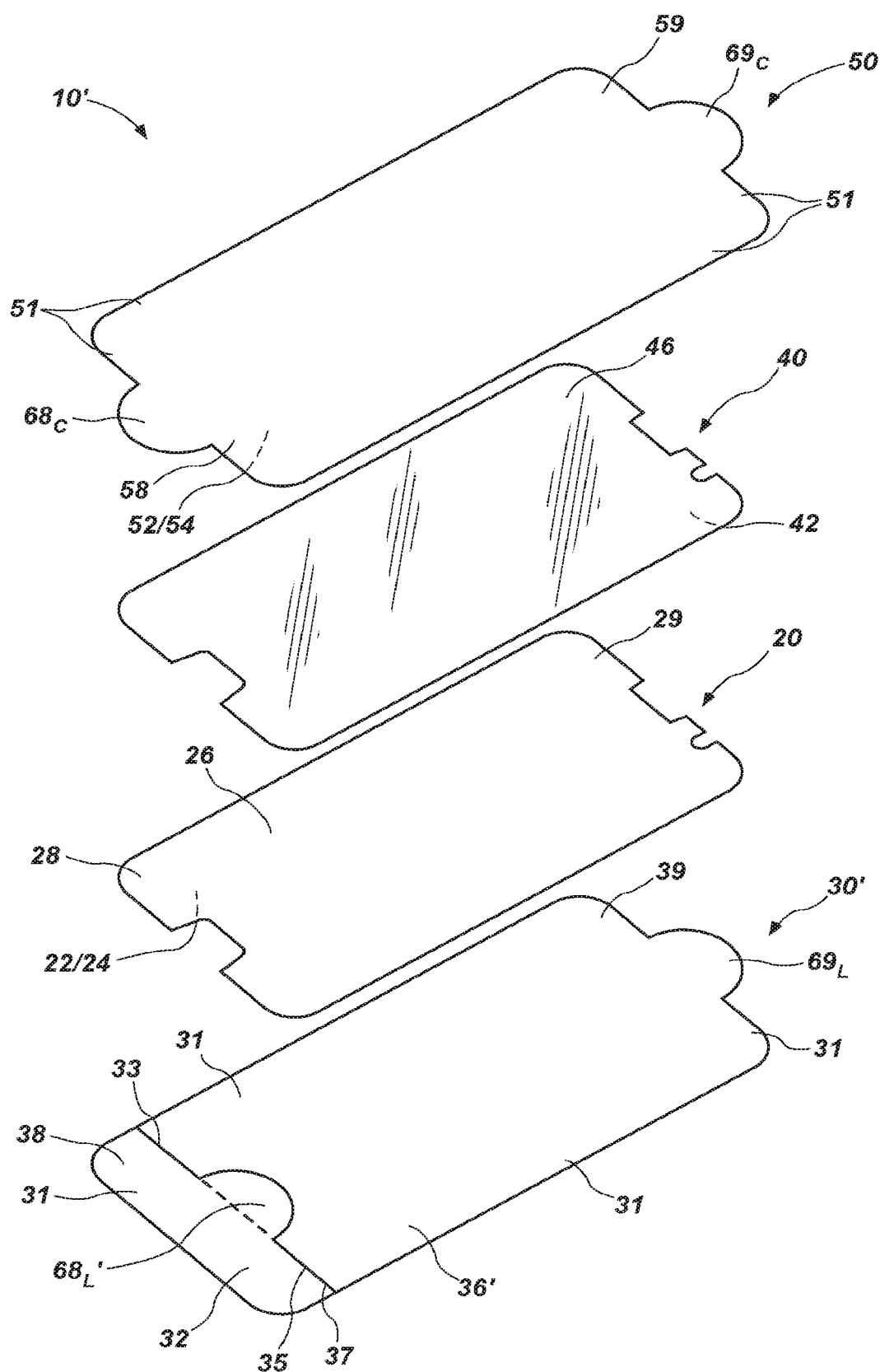
FIG. 1A is an assembly view of another embodiment of a system according to this disclosure.
Figure 2A:
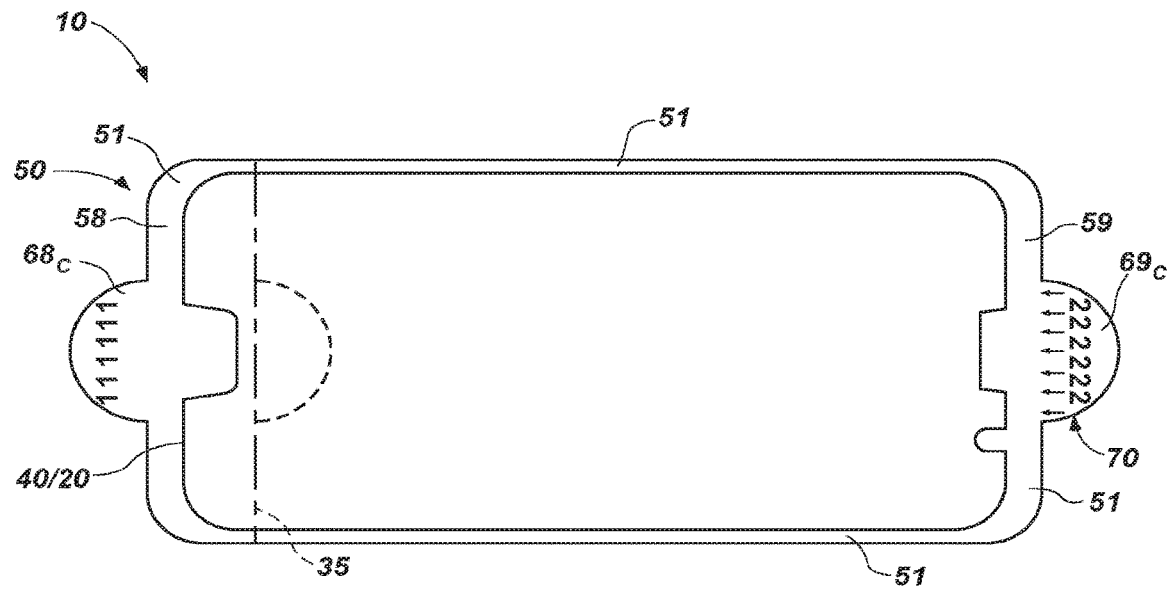
FIG. 2A is a top view of the embodiment of system shown in FIG. 1A.
Figure 3A:
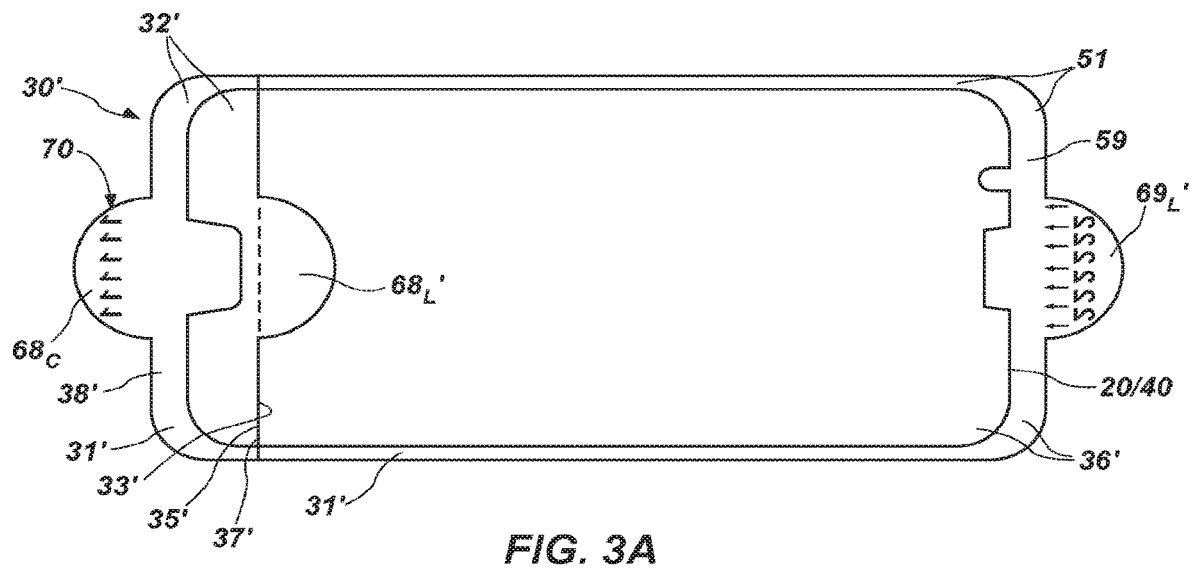
FIG. 3A is a bottom view of the embodiment of system shown in FIG. 1A.

FIGS. 1A, 2A and 3A depict a system 10' with another embodiment of liner 30', in which the strip liner 32' includes a tab $68_L$' that is oriented toward, and may overlap, the main liner 36'. By orienting the tab $68_L$' in this manner, a user may grasp tabs $69_C$ and $69_L$ while pulling tab $68_L$' away from tabs $69_C$ and $69_L$ to remove the strip liner 32' from the main liner 36', as will be described in further detail hereinafter, with reference to FIG. 4. All of the other elements and features of the liner 30' may be the same as the corresponding elements and features of the liner 30 described in reference to FIGS. 1, 2, and 3. As such, the remaining reference numerals that are used in FIGS. 1-3 have been duplicated in FIGS. 1A, 2A and 3A, respectively.

Turning now to FIGS. 4-9, and with continued reference to FIGS. 1, 2, and 3, an embodiment of a method for applying a protective film 20 to a surface 102 of a substrate 100 is depicted.

Figure 4:
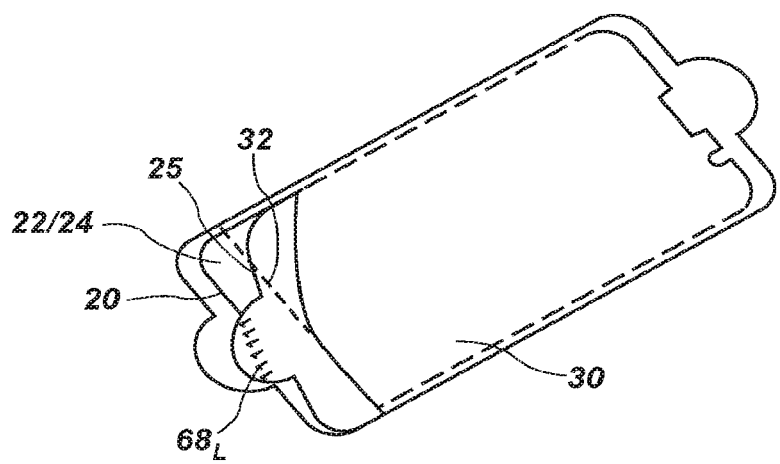
FIGS. 4-9 depict an embodiment of a method for applying a protective film to a surface of a substrate, such as a surface of an electronic device.

FIG. 4 shows tab $68_L$ and the strip liner 32 portion of the liner 30 being pulled away from the adhesive material 24 on the lower surface 22 of a protective film 20. This exposes a strip 25 of the adhesive material 24 on the lower surface 22 of the protective film 20.

Figure 5:
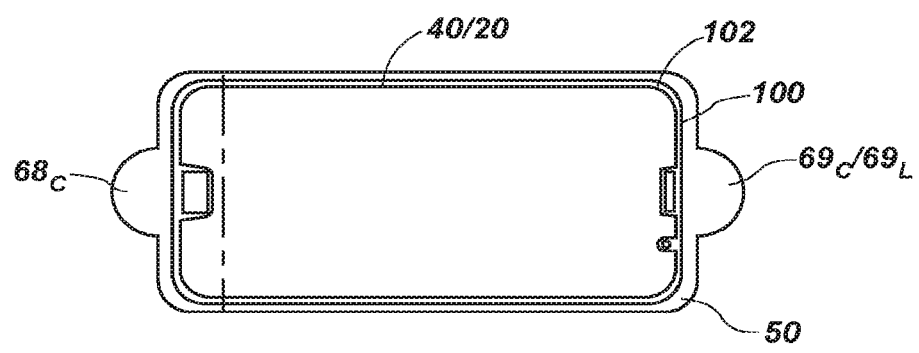

Once the strip 25 of adhesive material 24 has been exposed, the protective film 20 may be aligned with the surface 102 to which the protective film 20 is to be applied, as shown in FIG. 5. Specifically, FIG. 5 shows alignment of the release layer 40, which is visible through the cap shield 50 and the liner 30 (FIGS. 1-3), which has the same configuration as the protective film 20 and which is completely superimposed with the protective film 20, with the surface 102 of a display of a portable electronic device, such as a smart phone, a portable media player, a wearable electronic device or a tablet computing device. More specifically, an individual may grasp the tabs 68c and $69c/69_L$ to align the release layer 40 and, thus, the protective film 20 with the surface 102 of the substrate 100.

Figure 6:
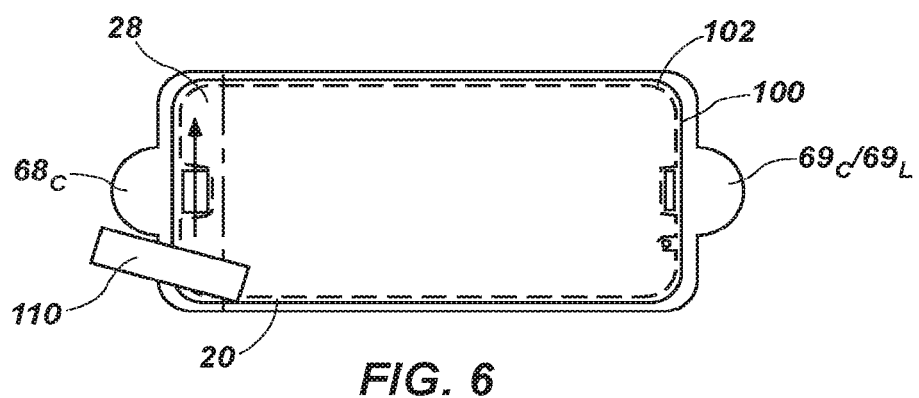

With the protective film 20 in alignment with the surface 102 to which the protective film 20 is to be adhered, the strip 25 of adhesive material 24 may be applied to the surface 102, as illustrated by FIG. 6, which will secure the first end 28 of the protective film 20 to the surface 102. The act of securing the first end 28 of the protective film 20 to the surface 102 may include applying the strip 25 (FIG. 4) of adhesive material 24 (FIG. 4) on the first end 28 to the surface 102 and pressing the first end 28 against the surface 102. Such pressure may be applied manually (e.g., with one or more fingers, etc.) and/or with a pressure application tool 110, such as a plastic card, a squeegee or the like.

Since only a relatively small strip 25 (FIG. 4) of adhesive material 24 (FIG. 4) is exposed and secured to the surface 102 of the substrate 100, if any misalignment has occurred (e.g., while securing the first end 28 of the protective film 20 to the surface, etc.), the first end 28 may be removed from the surface 102, the protective film 20 may be realigned with the surface 102 and the first end 28 of the protective film 20 may be re-secured to the surface 102 (e.g., with the strip 25 (FIG. 4) of the adhesive material 24 (FIG. 4), etc.). If such repositioning of the protective film 20 is desired or necessary, the first end 28 of the protective film 20 may be removed from the surface 102 by pulling tab $68_C$ and/or tabs $69_C$ and $69_L$ away from the surface 102.

As an alternative, the entire liner 30 may be removed from the lower surface 22 of the protective film 20 before any portion of the adhesive material 24 on the lower surface 22 contacts the surface 102. Such a technique may be employed in embodiments where the protective film 20 is rigid (e.g., formed from a glass, etc.) and/or when so-called "wet apply" processes are used. When such a technique is employed, the process steps shown and described in reference to FIGS. 7 and 8 may be omitted.

Figure 7:
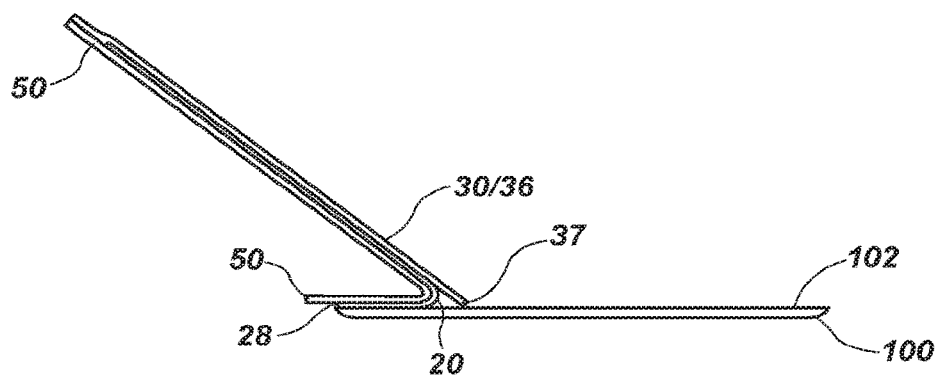

In some embodiments, including those where the protective film 20 comprises a flexible film, after the first end 28 of the protective film 20 has been adhesively secured to the surface 102 of the substrate 100, the second ends 29, 39 and 59 of the protective film 20, the liner 30 (i.e., the main liner 36) and the cap shield 50, respectively, may be lifted away from the surface 102, as depicted by FIG. 7. As these portions of the assembled elements of the system 10 are lifted away from the surface 102 and back over the first ends 58 and 28 of the cap shield 50 and the protective film 20, respectively, an edge 37 of the main liner 36 may peel away from the adhesive material 24 (FIG. 1) on the lower surface 22 (FIG. 1) of the protective film 20, and may rest against the surface 102 of the substrate 100.

Figure 8:
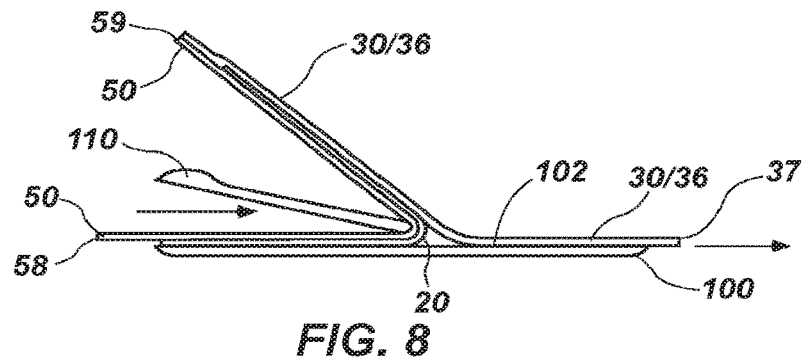
Figure 9:
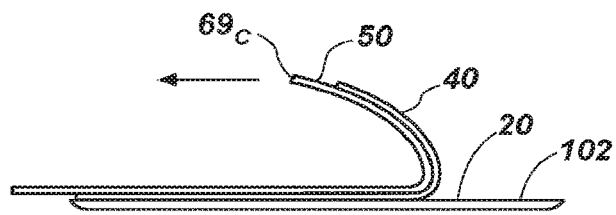

With the system 10 in the arrangement depicted by FIG. 7, as illustrated by FIG. 8, a force (e.g., a linear pressure front, etc.) may be applied across the cap shield 50 at a location adjacent to the first end 58 of the cap shield 50, and moved along the cap shield 50 over a length (or height) of the cap shield 50 toward its second end 59. Such force may be applied with a suitable application tool 110, such as a plastic card, a squeegee or the like. As force is applied in the direction illustrated by FIG. 8, the main liner 36 is removed from the adhesive material 24 on the lower surface 22 of the protective film 20 and the edge 37 of the main liner 36 moves along the surface 102 of the substrate 100 until the main liner 36 has been completely removed from the lower surface 22 of the protective film 20 and the protective film 20 has been fully secured to the surface 102.

Once the protective film 20 has been properly secured to the surface 102 of the substrate 100, the cap shield 50 and the release layer 40 may be removed from the upper surface 26 of the protective film 20. Removal of the cap shield 50 and the release layer 40 may be effected by pulling tab 69c away from the surface 102. As illustrated, tab 69c and the second end 59 of the cap shield 50 may be pulled back across the protective film 20 and the surface 102 on which the protective film 20 resides.

Figure 10:
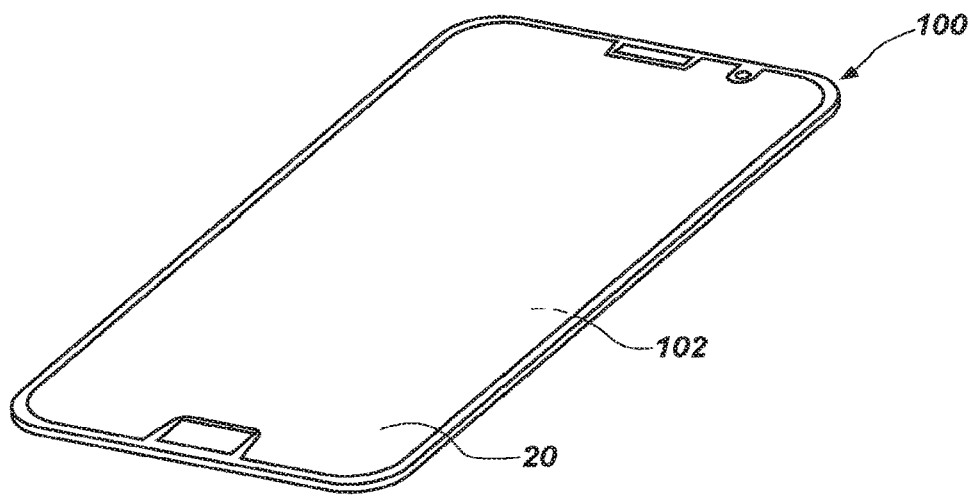
FIG. 10 shows an embodiment of a substrate with a protective film applied to a surface thereof.

With reference now turned to FIG. 10, an embodiment of a substrate 100 is shown with a surface 102 to which a protective film 20 has been applied. The substrate 100 may, without limitation, comprise a portable electronic device or a consumer electronic device, such as a smart phone, a portable media player, a tablet computing device, a wearable electronic device, a laptop computer or the like. The surface 102 of such a substrate 100 may comprise a display or any other feature that may be subjected to conditions that may, without the presence of a protective film 20 thereon, detrimentally affect the appearance of the surface 102.

Although the preceding disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. A system for applying a protective film to an electronic device, comprising:
   a protective film including a lower surface that carries adhesive material and an upper surface opposite from the lower surface;
   a cap shield over the upper surface of the protective film and removable from the protective film upon securing the protective film to the electronic device; and
   a liner secured to the adhesive material on the lower surface of the protective film and including a liner strip, a main liner, and a breakable boundary that can be fractured between the liner strip and the main liner.

2. The system of claim 1, wherein the breakable boundary enables the liner strip to be fractured from the main liner and to be removed from the adhesive material without removing the main liner from the adhesive material.

3. A system for applying a protective film to an electronic device, comprising:
   a protective film including a lower surface that carries adhesive material and an upper surface opposite from the lower surface;
   a cap shield over the upper surface of the protective film and removable from the protective film upon securing the protective film to the electronic device; and
   a liner secured to the adhesive material on the lower surface of the protective film, the liner including a liner strip and a main liner, the liner including a breakable boundary between the liner strip and the main liner, the breakable boundary enabling the liner strip to be fractured from the main liner and to be removed from the adhesive material without removing the main liner from the adhesive material.

4. The system of claim 3, wherein the liner strip is positioned at a first end of the protective film and covers a strip of the adhesive material on the lower surface of the protective film at the first end of the protective film.

5. The system of claim 4, wherein the liner strip includes a first tab protruding beyond the first end of the protective film.

6. The system of claim 5, wherein the main liner includes a second tab protruding beyond a second end of the protective film.

7. The system of claim 3, further comprising:
   a release layer beneath the cap shield.

8. The system of claim 7, wherein the release layer facilitates removal of the cap shield from the upper surface of the protective film without overcoming adhesion of the protective film to the surface of the electronic device.

9. The system of claim 1, wherein the cap shield distributes pressure applied thereto over the protective film to prevent damage to the protective film while securing the protective film to a surface of the electronic device.

10. The system of claim 1, wherein the protective film has a configuration that corresponds to a configuration of a surface of the electronic device on which the protective film is to be secured.

11. A system for applying a protective film to an electronic device, comprising:
    a protective film including an adherent surface that carries adhesive material and an outer surface opposite from the adherent surface;
    a liner secured to the adhesive material on the adherent surface of the protective film, the liner including:
       a liner strip covering a strip of the adhesive material on the adherent surface of the protective film, the liner strip including a first tab protruding beyond an edge of the liner strip and a corresponding edge of the protective film so as to enable removal of the liner strip from the strip of the adhesive material; and
       a main liner covering a remainder of the adhesive material on the adherent surface of the protective film, the main liner including a second tab protruding beyond an edge of the main liner and a corresponding edge of the protective film; and
    a cap shield over an outer surface of the protective film and removable from the protective film upon securing the protective film to the electronic device.

12. The system of claim 11, wherein a breakable boundary between the liner strip of the liner and the main liner of the liner is capable of being fractured to define adjacent edges of the liner strip.

13. The system of claim 12, wherein the breakable boundary between the liner strip of the liner and the main liner of the liner is defined by a cut through the liner, the cut extending continuously across the liner.

14. The system of claim 11, wherein the cap shield, the protective film, and the liner comprise transparent elements, and further comprising a release layer beneath the cap shield and having a color to facilitate accurate alignment of the protective film with a surface of the electronic device.

15. The system of claim 14, wherein the color of the release layer and the protective film have configurations that corresponds to a configuration of a surface of an electronic device on which the protective film is to be secured.

16. The system of claim 11, wherein the cap shield is capable of preventing damage to the outer surface of the protective film as pressure is applied to an upper surface of the cap shield to secure the adherent surface of the protective film to a surface of the electronic device.

17. The system of claim 11, wherein the cap shield is pre-lifted away from the protective film at a second end of the protective film and then re-adhered in place over the protective film to enable a second end of the cap shield at the second end of the protective film to be more easily removed than a first end of the cap shield at a first end of the protective film, and to prevent removal of the cap shield instead of the liner strip from the first end of the protective film.

18. The system of claim 17, wherein the cap shield is not pre-lifted at the first end of the protective film.

19. The system of claim 11, wherein the cap shield includes:
    a first tab protruding beyond a first end of the protective film and superimposed with the first tab of the liner strip; and
    a second tab protruding beyond the second end of the protective film and superimposed with the second tab of the main liner.

20. The system of claim 19, wherein the first tab of the cap shield and the second tab of the cap shield enable proper alignment of the protective film over the surface of the electronic device after the strip liner has been removed from a bottom surface of the protective film.

* * * * *